(12) United States Patent
Lee et al.

(10) Patent No.: US 7,766,114 B2
(45) Date of Patent: Aug. 3, 2010

(54) DRIVING MECHANISM FOR THE MOTORIZED BICYCLE

(76) Inventors: Sen-Yung Lee, 9F., No. 84, Section 3, Chang-Rong Rd., Tainan City (TW); Shueei-Muh Lin, No. 17, Lane 99, Ming-Shin Rd., Tainan City (TW); Jer-Jia Sheu, No. 101, Section 6, Fu-An Rd., Tainan City (TW); Yung-Chang Cheng, No. 14, Lane 1, Cheng-Gong Rd., Linbian Township, Pingtung County (TW)

( * ) Notice: Subject to any disclaimer, the term of this patent is extended or adjusted under 35 U.S.C. 154(b) by 140 days.

(21) Appl. No.: 12/230,721

(22) Filed: Sep. 4, 2008

(65) Prior Publication Data

US 2010/0051373 A1 Mar. 4, 2010

(51) Int. Cl.
 *B62M 23/02* (2010.01)
(52) U.S. Cl. .................. 180/205; 180/206; 180/207; 180/223
(58) Field of Classification Search .......... 180/205, 180/206, 207, 223
 See application file for complete search history.

(56) References Cited

U.S. PATENT DOCUMENTS

| 4,132,281 | A | * | 1/1979 | Gaddi | 180/205 |
|---|---|---|---|---|---|
| 5,829,546 | A | * | 11/1998 | Tseng | 180/206 |
| 6,152,249 | A | * | 11/2000 | Li et al. | 180/205 |
| 6,196,347 | B1 | * | 3/2001 | Chao et al. | 180/206 |
| 6,276,479 | B1 | * | 8/2001 | Suzuki et al. | 180/207 |
| 6,286,616 | B1 | * | 9/2001 | Kutter | 180/205 |
| 6,296,072 | B1 | * | 10/2001 | Turner | 180/220 |
| 6,595,072 | B2 | * | 7/2003 | Liao | 73/862.195 |
| 6,629,574 | B2 | * | 10/2003 | Turner | 180/206 |
| 7,284,631 | B2 | * | 10/2007 | Rizzetto | 180/205 |

\* cited by examiner

*Primary Examiner*—Lesley Morris
*Assistant Examiner*—Michael R Stabley
(74) *Attorney, Agent, or Firm*—Rosenberg, Klein & Lee

(57) ABSTRACT

A driving mechanism for motorized bicycle is provided. The driving mechanism comprises a motor driving transmission device, a front driving sprocket and a pedal driving transmission device. The motor driving transmission device inwardly includes a motor shell, a magnet stator, an electromagnetic wire-coiled rotor and a cylindrical hollow rotatable shaft. The front driving sprocket has a transmission rotatable sleeve disposed therein for insertion of the hollow rotatable shaft there between. The pedal driving transmission device includes a pair of pedal cranks and a pedal driving shaft passing through the transmission rotatable sleeve and hollow rotatable shaft. First and Second single direction irreversible transmission devices are arranged such that either the motor driving transmission device or pedal driving transmission device may drive the transmission rotatable sleeve and front driving sprocket in proper rotational direction.

8 Claims, 15 Drawing Sheets

DRIVING MECHANISM FOR THE MOTORIZED BICYCLE

FIELD OF THE INVENTION

The present invention relates to a "driving mechanism for the motorized bicycle", particularly for one having operations of pedal driving and motor driving modes so that the effects in simple and compact structure, reducing occupied space, decreasing production cost, and balancing the transverse weight equilibrium and lowering the weight center as well as employing speed changing function to save power energy and enhance speed changing and output torque range as well as increase slope-climbing capability can be achieved.

BACKGROUND OF THE INVENTION

For enhancing the availability of the bicycle and reducing the physical strength burden for the bicycle rider, the various motorized bicycles that using motor driving means to replace for conventionally manually pedal driving means are introduced into the market with popular acceptance. Currently, the motor driving means of the conventional motorized bicycle are classified into four categories by transmission contrivance as below:

First category is directly motor driving bicycle that a motor is externally installed on the front wheel or rear wheel with motor shaft being parallel to the wheel axle.

Second category is directly motor driving bicycle that a motor is installed on the frame over front wheel or rear wheel externally with motor shaft being perpendicular to the wheel axle.

Third category is directly motor driving bicycle that a motor is internally installed in the hub of front wheel or rear wheel so that the motor is rotated with the installed wheel integrally.

Fourth category is indirectly motor driving bicycle that a motor is externally installed at suitable distal place away from the driven front sprocket with motor shaft being perpendicular to the transmission axle so that the motor driving torque is exerted on the driven front sprocket via a transmission element.

So far, the directly motor driving type of first, second and third motorized bicycle categories enjoy dominantly big market share while fourth motorized bicycle category takes trivially petty market share.

The driving means for the first motorized bicycle category is almost as shown in the FIG. 1, which illustrates the new model patent of Taiwan Published No. 522964. For this conventional motorized bicycle, the driving motor A1 is externally installed on the rear wheel with motor shaft being parallel to the axle of the driven rear wheel. By means of a transmission element A2, the motor driving torque is exerted on the driven rear sprocket A3, which firmly fixed on the driven rear wheel.

The driving means for the second motorized bicycle category is almost as shown in the FIG. 2. For this conventional motorized bicycle, the driving motor B1 is installed on the frame B2 over rear wheel externally with motor shaft being perpendicular to the axle of the driven rear wheel. By means of a transmission element, the motor driving torque is exerted on the driven rear sprocket B3, which firmly fixed on the driven rear wheel.

The driving means for the third motorized bicycle category is almost as shown in the FIG. 3, which illustrates the new model patent of Taiwan Published No. M259755, or in the FIG. 4, which illustrates the new model patent of Taiwan Published No. 467091.

For the conventional motorized bicycle shown in the FIG. 3, the driving motor C1 is internally installed in the hub of front wheel C2 directly so that the motor is rotated with the installed front wheel C2 integrally in coaxial manner. By means of such transmission, the motor driving torque is directly exerted on the hub of driven front wheel C2.

For the conventional motorized bicycle shown in the FIG. 4, the driving motor D1 is internally installed in the hub of rear wheel D2 directly so that the motor is rotated with the installed rear wheel D2 integrally in coaxial manner. By means of such transmission, the motor driving torque is directly exerted on the hub of driven rear wheel D2.

The driving means for the fourth motorized bicycle category is almost as shown in the FIG. 5, which illustrates the new model patent of Taiwan Published No. 192351, or in the FIG. 6, which illustrates the new model patent of Taiwan Published No. 519087.

For the conventional motorized bicycle shown in the FIG. 5, the driving motor E1 is externally installed at tubular front stem away from the driven front sprocket E2 with motor shaft being perpendicular to the transmission shaft E3. Via a chain E5, by means of a transmission element E4, which is parallel to the driven front sprocket E2, the motor driving torque is indirectly exerted on the hub of driven front wheel E2, which further drives the rear wheel via another chain to rotate forwardly.

For the conventional motorized bicycle shown in the FIG. 6, the driving motor E1 is externally linked on the driven front sprocket F2 directly via bevel gears with motor shaft being perpendicular to the transmission shaft F3. By means of a transmission device F5 (as shown in the FIG. 7), which is coupled to the driven front sprocket F2, the motor driving torque is indirectly exerted on the hub of driven front wheel F2, which further drives the rear wheel via a chain F4 to rotate forwardly.

However, some drawbacks respectively exist in the four motorized bicycle categories aforesaid as below:

1. For directly motor driving bicycles of first, second and third categories, the motor (such as A1, B1, D1 and E1) is externally installed on the front wheel or rear wheel without taking advantage of employing the function of derailleur so that not only the flexibility and availability in slope-climbing capability is reduced but also the more power and physical effort are consumed comparing to that motorized bicycle having derailleur installed thereon.

2. For the first motorized bicycle category as shown in the FIG. 1, since the driving motor A1 is externally installed on the rear wheel via a transmission element A2 to relay the motor driving torque to the driven rear sprocket A3, relatively longer transmission element A2 (such as chain or belt) is required due to big diameter of the rear wheel so that not only the cost of transmission element A2 is rather high but also the dropping off the transmission element A2 becomes easy due to fluctuation in the tautness and relaxation.

3. For the second motorized bicycle category as shown in the FIG. 2, since the driving motor B1 is installed on the frame B2 over rear wheel externally with motor shaft being perpendicular to the axle of the driven rear wheel, a special angled transmission element such as a set of bevel gears are required to relay the motor driving torque to the driven rear sprocket B3. The set of bevel gears serving as angled transmission element here is a precision and expensive mechanical part subject to frequent lubrication timely. Moreover, since such driving motor B1 is externally installed on one side of the frame B2, not only the serious transverse weight imbalance will incur but also the space is reduced thereby so that the pillion footrest is difficult to be suitably disposed.

4. For the third motorized bicycle category as shown in the FIG. 3, where the driving motor C1 is internally installed in the hub of front wheel C2 directly so that the motor is rotated with the installed front wheel C2 integrally in coaxial manner, and the other motorized bicycle shown in the FIG. 4, where the driving motor D1 is internally installed in the hub of rear wheel D2 directly so that the motor is rotated with the installed rear wheel D2 integrally in coaxial manner. The motor C1 or D1 used here is an expensive tailor-made motor, which is susceptible to bounce if not well-adjusted, so that not only the cost is increased but also the bicycle is vulnerable to bumpy road. Moreover, the wheel used here is customized product instead of standardized one that also incurred higher cost bother.

5. For the rare fourth motorized bicycle category as shown in the FIG. 5, where the pedal crank and the front sprocket E2 are together driven by the driving motor E1 when in motor driving operation mode so that the rider must lift his/her feet up to avoid from being hit by the pedals or pedal crank. Besides, the extra load in meaninglessly driving pedal crank curtails the power supplying time in consequence of the incurrence of electric energy waste.

For the other design of same category as shown in the FIG. 6, since the transmission element F5 and the driven front sprocket F2 are externally installed at the same side (as shown in the FIG. 7), not only the serious transverse weight imbalance will incur but also the space is reduced thereby so that the transmission device F5 is difficult to be suitably disposed. In worse case, the integral strength of the bicycle will be reduced even the transmission device F5 is installed. Moreover, the transmission device F5 (as shown in the FIG. 7) used here comprises a set of bevel gears and a single-direction irreversible transmission element F51, wherein, said set of bevel gears, as stated above, serving as angled transmission element here is a precision and expensive mechanical part subject to frequent lubrication timely; and the complicated structural shape of said single-direction irreversible transmission element F51 (as shown in the FIG. 8) make itself should be specially customized through difficult process with very high cost.

6. The pedal driving operation mode is in need if no electric power is supplied for all four motorized bicycle categories aforesaid. The pedal driving force is not only used to drive the bicycle but also simultaneously to drive the extra cumbersome load of the idle motor, which is more than the load of single bicycle due to magnetic attraction between the stator and the rotor.

Realizing and addressing all the drawbacks aforesaid, the applicant of the present invention devotes himself to study, research and develop to improve the driving mechanism for the motorized bicycle. Eventually, the "driving mechanism for the motorized bicycle" of the present invention is successfully contrived after constantly experiments and improvements.

SUMMARY OF THE INVENTION

Accordingly, the objects of the present invention are to provide a "driving mechanism for the motorized bicycle" having features as below:
  1. Simple and compact structure;
  2. Reducing occupied space;
  3. Decreasing production cost;
  4. Balancing the transverse weight equilibrium and lowering the weight center; and
  5. Employing speed changing function to save power energy and enhance speed changing and output torque range as well as increase slope-climbing capability and effect.

In order to accomplish the objects aforesaid, the applicant of the present invention specially contrive a "driving mechanism for the motorized bicycle", whose driving mechanism is installed in a frame manifold node thereof, mainly comprises a motor driving transmission device, a front driving sprocket and a pedal driving transmission device, wherein, said motor driving transmission device, which is disposed on the frame manifold node, inwardly includes a motor shell, a magnet stators, an electromagnetic wire-coiled rotor and a cylindrical hollow rotatable shaft orderly; said front driving sprocket has a transmission rotatable sleeve disposed therein for inserting the hollow rotatable shaft such that a ring-shaped first single-direction irreversible transmission device can be annularly sandwiched in between in concentric manner; said pedal driving transmission device comprises a pair of pedal cranks and a pedal driving shaft pedal crank, which runs through the transmission rotatable sleeve and hollow rotatable shaft, such that a ring-shaped second single-direction irreversible transmission device can be annularly sandwiched in between in concentric manner; And additionally, both of the first and second single-direction irreversible transmission devices are arranged in counter manner with synergistic action so that either of motor driving transmission device or pedal driving transmission device can drive the transmission rotatable sleeve and front driving sprocket in same proper rotational direction.

The "driving mechanism for the motorized bicycle" in accordance with disclosure above, wherein, said motor shell with magnet stators of the motor driving transmission device is directly fixed on the frame manifold node so that the hollow rotatable shaft, first single-direction irreversible transmission device, transmission rotatable sleeve and front driving sprocket can be driven by the wire-coiled rotor to rotate.

The "driving mechanism for the motorized bicycle" in accordance with disclosure above, wherein, said motor shell in the motor driving transmission device is firmly fixed with the frame manifold node as an integral body, and a speed changing gear assembly is disposed between the motor driving transmission device and front driving sprocket, wherein said speed changing gear assembly is a planetary epicyclic gear cluster comprising a sun gear, an outer ring gear and plural planet gears, wherein, said sun gear is fixed on the hollow rotatable shaft; each of said planet gears is used to mesh with the sun gear and the outer ring gear respectively having a spindle engaged with a integrally protruding coupling spindles on a partition disk; facing the front driving sprocket mounting side, said outer ring gear has a hollow cylinder protruded out of the frame manifold node for accommodating the transmission rotatable sleeve of the front driving sprocket; Presently, the first single-direction irreversible transmission device is annularly sandwiched between the hollow cylinder and transmission rotatable sleeve so that the speed changing gear assembly, first single-direction irreversible transmission device and front driving sprocket with transmission rotatable sleeve are orderly driven by the hollow rotatable shaft to rotate in coaxial manner.

The "driving mechanism for the motorized bicycle" in accordance with disclosure above, wherein, a speed changing gear assembly is further disposed between the motor driving transmission device and front driving sprocket, wherein said speed changing gear assembly is a planetary epicyclic gear cluster comprising a sun gear, an outer ring gear, plural planet gears and a coupling basin, wherein, said sun gear is fixed on the hollow rotatable shaft; said outer ring gear is integrally molded with the peripheral of the motor shell directly being driven by the magnet stator; each of said planet gears is used to mesh with the sun gear and the outer ring gear respectively having a protruding spindles inserted in a corresponding bore on the coupling basin; facing the front driving sprocket mounting side, said coupling basin has a accommodating cavity protruded out of the frame manifold node for containing the transmission rotatable sleeve of the front driving sprocket; Presently, the first single-direction irreversible transmission device is annularly sandwiched between the accommodating cavity and transmission rotatable sleeve so that the speed changing gear assembly, first single-direction irreversible transmission device and front driving sprocket with transmission rotatable sleeve are orderly driven by the motor shell to rotate in coaxial manner.

The "driving mechanism for the motorized bicycle" in accordance with disclosure above, wherein, said first single-direction irreversible transmission device comprises an outer ratchet ring and an inner catch ring, wherein said outer ratchet ring, which is driven by the motor driving transmission device via hollow rotatable shaft directly or indirectly to rotate, has plural ratchet notches of cogged ratchet wheel created on the internal rim thereof; and said inner catch ring, which annularly wraps over outer wall of the transmission rotatable sleeve, has plural spring-loaded pawls configured in the outer rim thereof to rebound up and drop into the ratchet notches on the outer ratchet ring so that the inner catch ring is caught and brought by the outer ratchet ring to co-rotate simultaneously in single-direction rotation; Thus, after the hollow rotatable shaft having been driven by the motor driving transmission device, the transmission rotatable sleeve of front driving sprocket is further driven by the hollow rotatable shaft via the first single-direction irreversible transmission device in single-direction rotation.

The "driving mechanism for the motorized bicycle" in accordance with disclosure above, wherein, said second single-direction irreversible transmission device comprises an outer ratchet ring and an inner catch ring, wherein said outer ratchet ring, which is annularly wrapped by inner wall of the transmission rotatable sleeve, has plural ratchet notches of cogged ratchet wheel created on the internal rim thereof; and said inner catch ring, which is driven by the pedal driving transmission device via pedal driving shaft to rotate, has plural spring-loaded pawls configured in the outer rim thereof to rebound up and drop into the ratchet notches on the outer ratchet ring so that the outer ratchet ring is caught and brought by the inner catch ring to co-rotate simultaneously in single-direction rotation; Thus, after the pedal driving shaft having been driven by the pedal driving transmission device, the transmission rotatable sleeve of front driving sprocket is further driven by the pedal driving shaft via the second single-direction irreversible transmission device in single-direction rotation.

The "driving mechanism for the motorized bicycle" in accordance with disclosure above, wherein, a clutch is disposed between the transmission rotatable sleeve and pedal driving shaft; thereby the pedal driving transmission device is indirectly driven by the motor driving transmission device via the transmission rotatable sleeve to have rehabilitating effect.

The "driving mechanism for the motorized bicycle" in accordance with disclosure above, wherein, said clutch is a male threaded pin disposed on the transmission rotatable sleeve in radial manner for screwing into a female threaded bore of the pedal driving shaft) to let the transmission rotatable sleeve detachably cling to the pedal driving shaft in coupling manner to co-rotate integrally.

DETAILED DESCRIPTION OF THE PREFERRED EMBODIMENT

Figure 1:
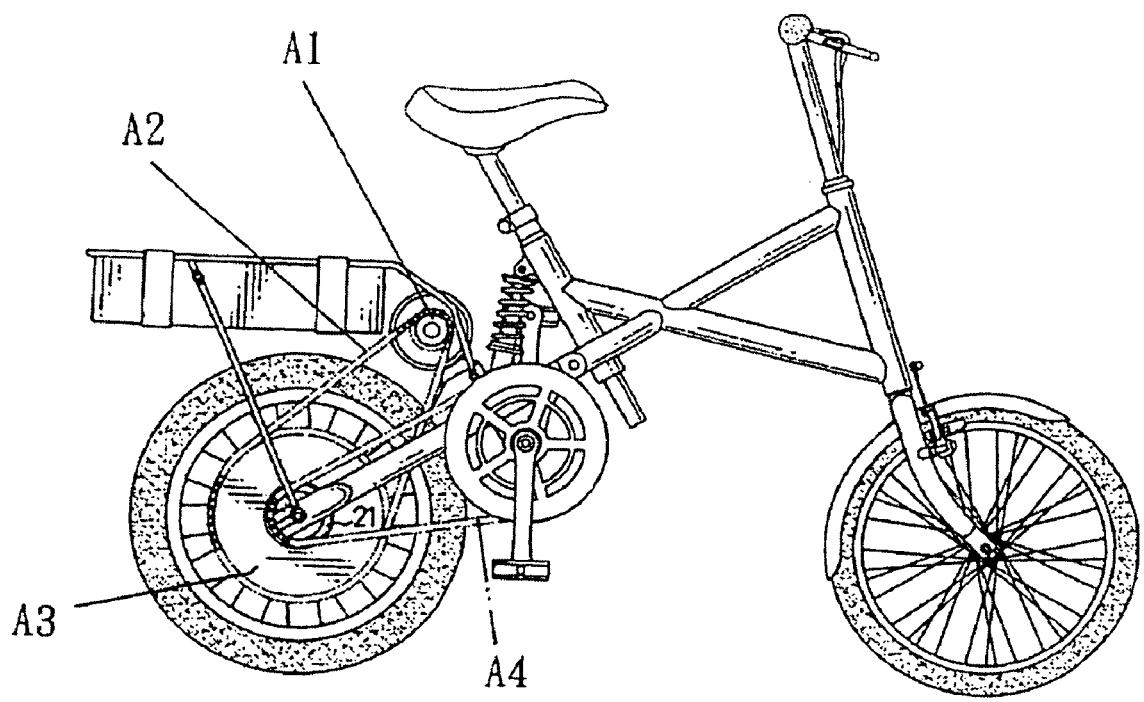
FIG. 1 is the appearance view showing the first driving method for the conventional motorized bicycle.
Figure 2:
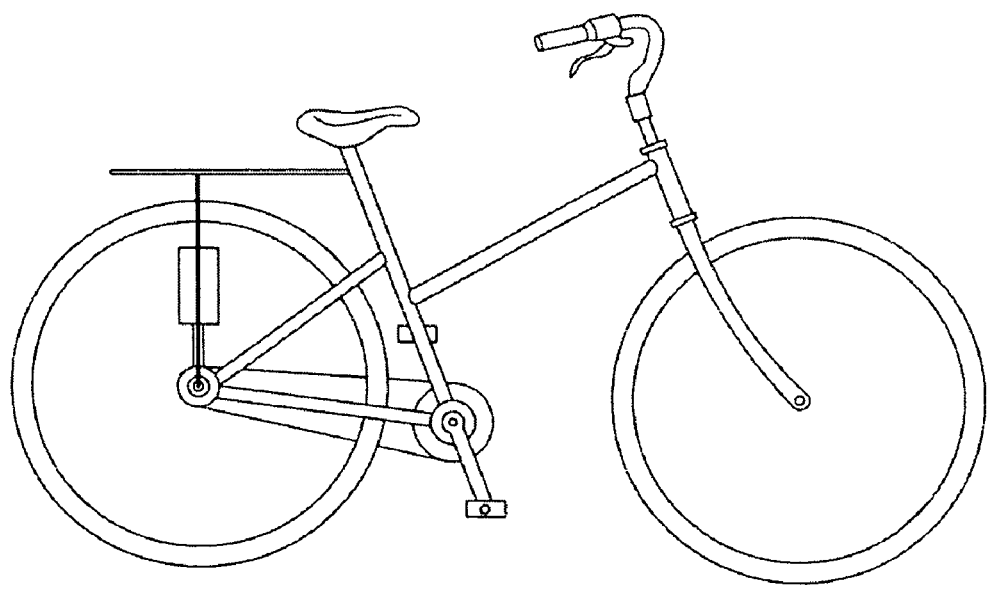
FIG. 2 is the appearance view showing the second driving method for the conventional motorized bicycle.
Figure 3:
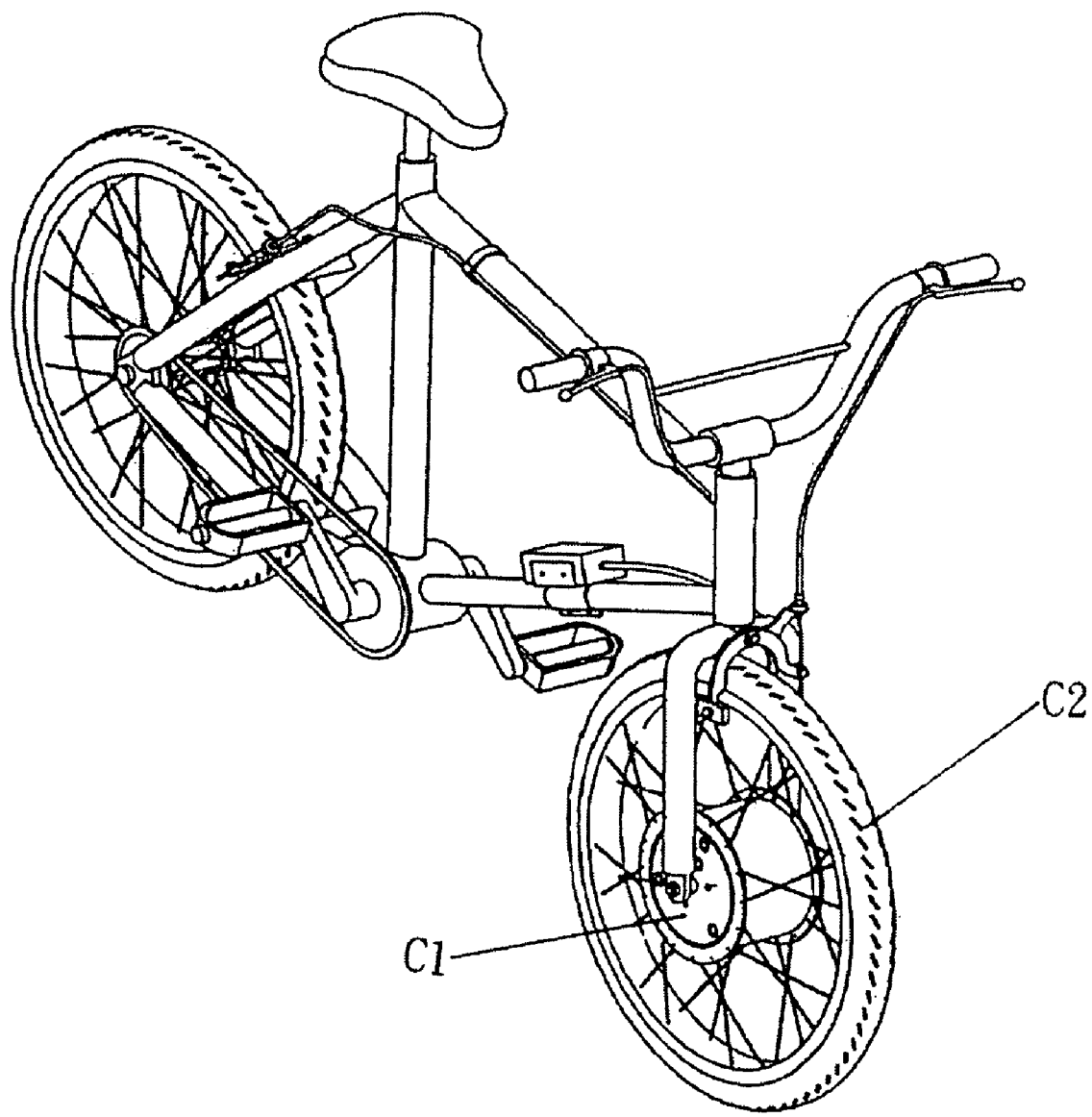
FIG. 3 is the first appearance view showing the third driving method for the conventional motorized bicycle.
Figure 4:
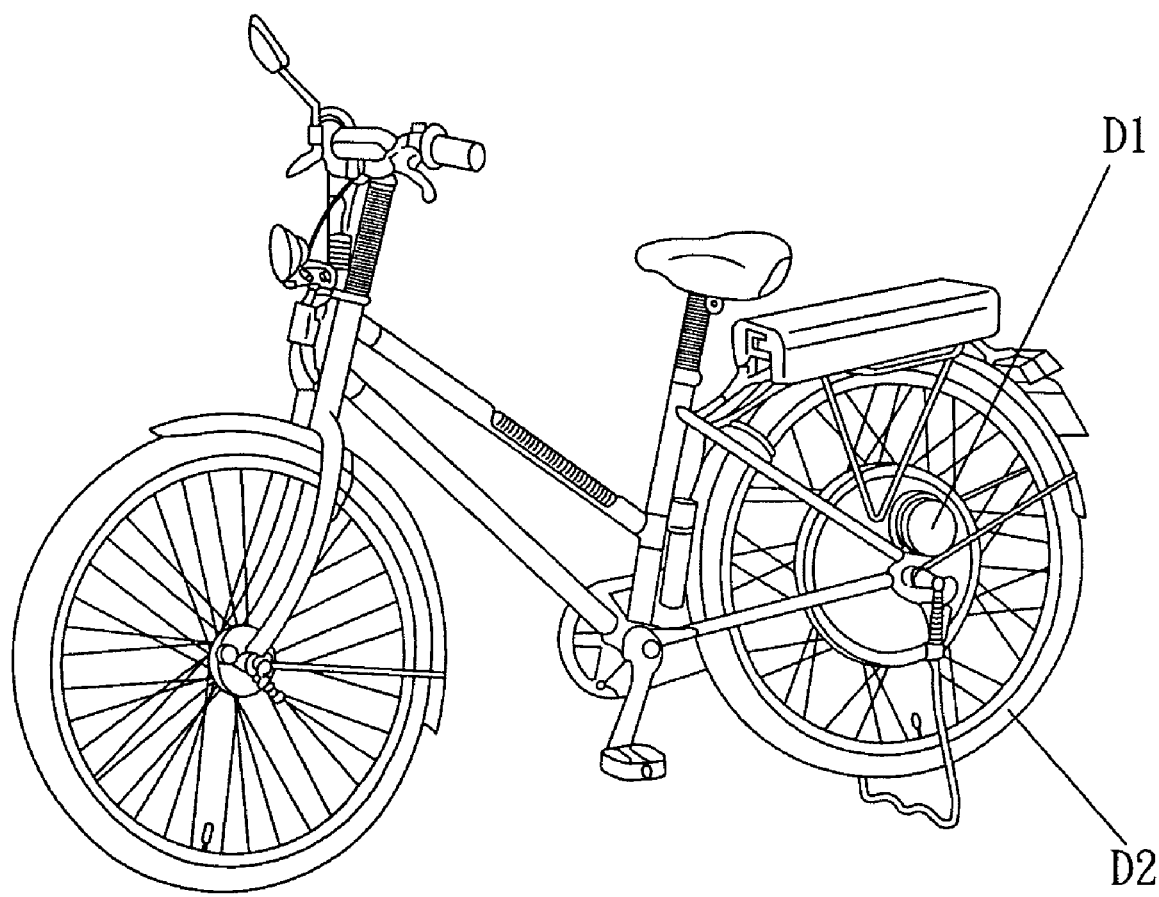
FIG. 4 is the second appearance view showing the third driving method for the conventional motorized bicycle.
Figure 5:
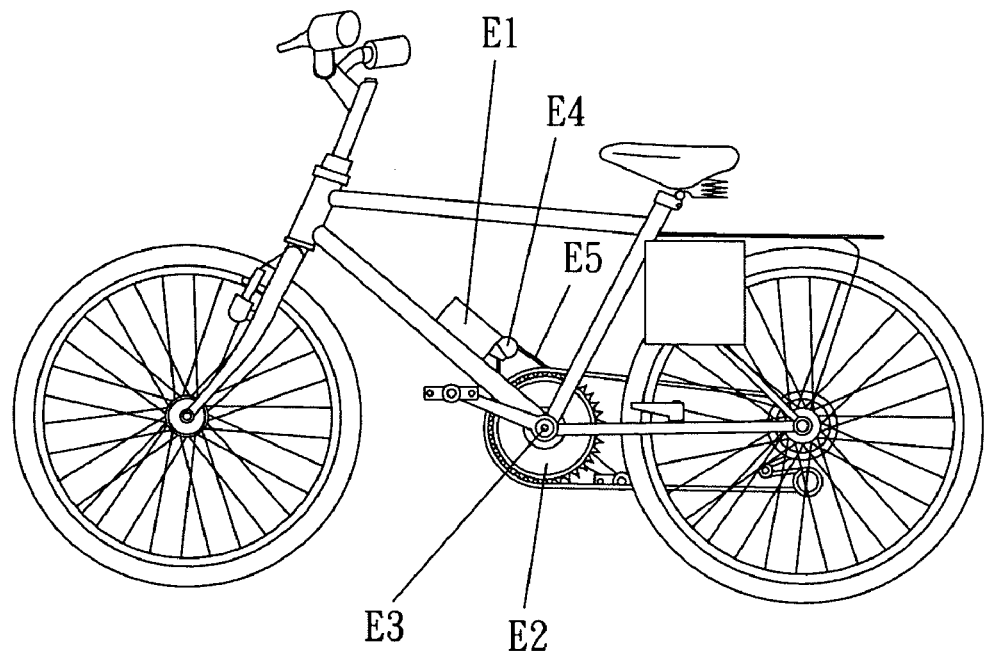
FIG. 5 is the first appearance view showing the fourth driving method for the conventional motorized bicycle.
Figure 6:
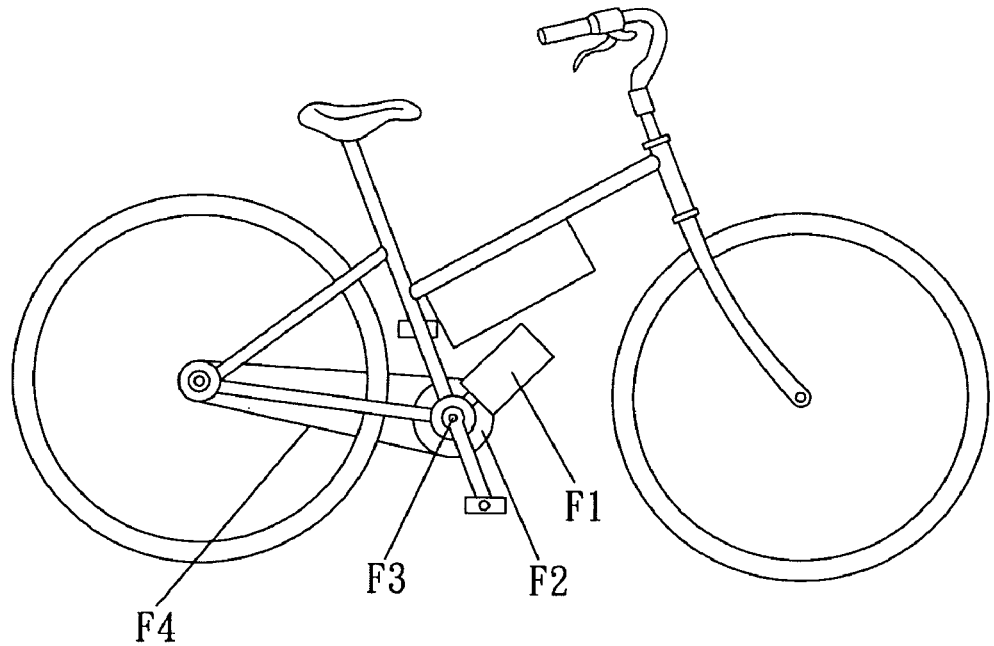
FIG. 6 is the second appearance view showing the fourth driving method for the conventional motorized bicycle.
Figure 7:
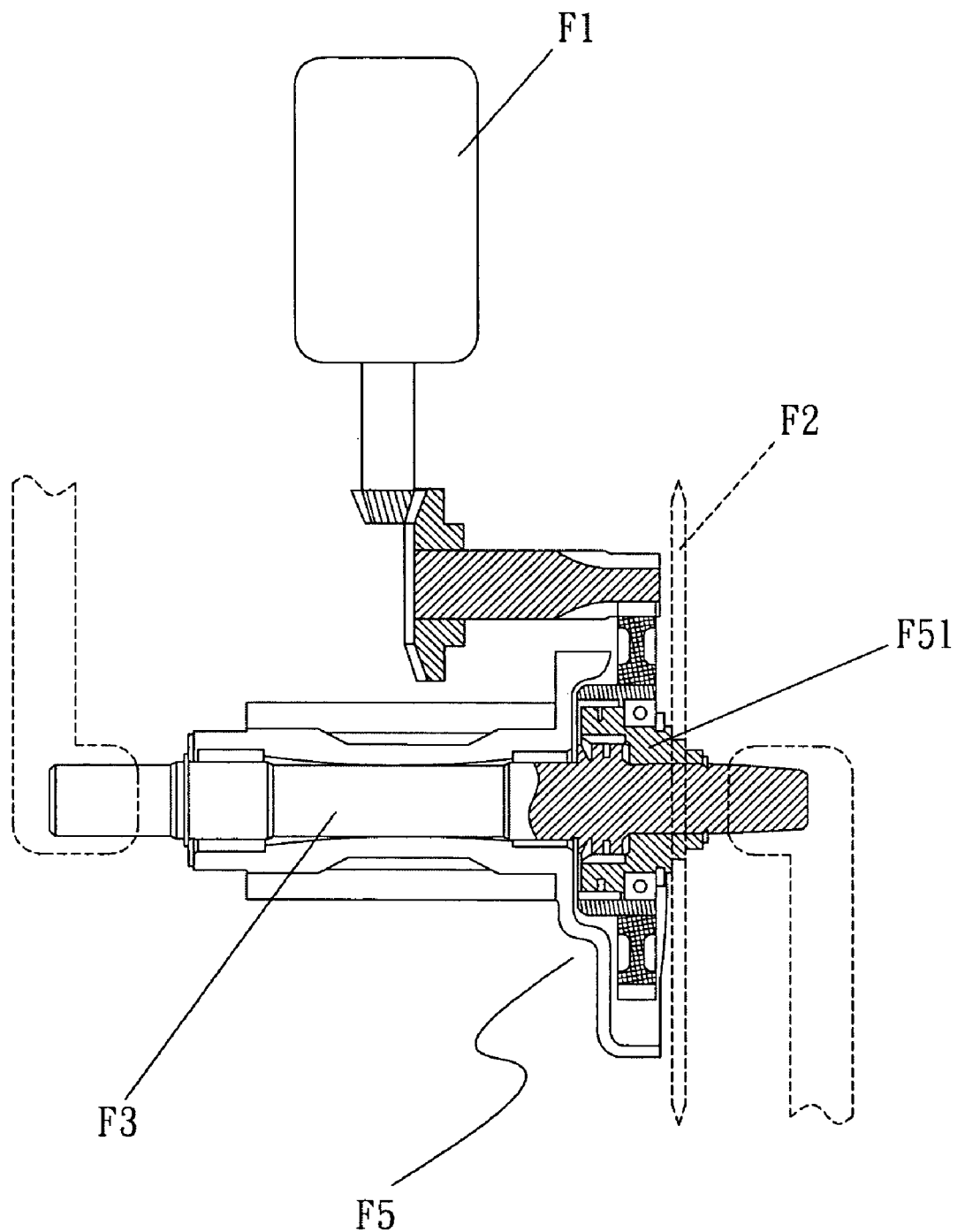
FIG. 7 is cross section view of the fourth driving method shown in the FIG. 6.
Figure 8:
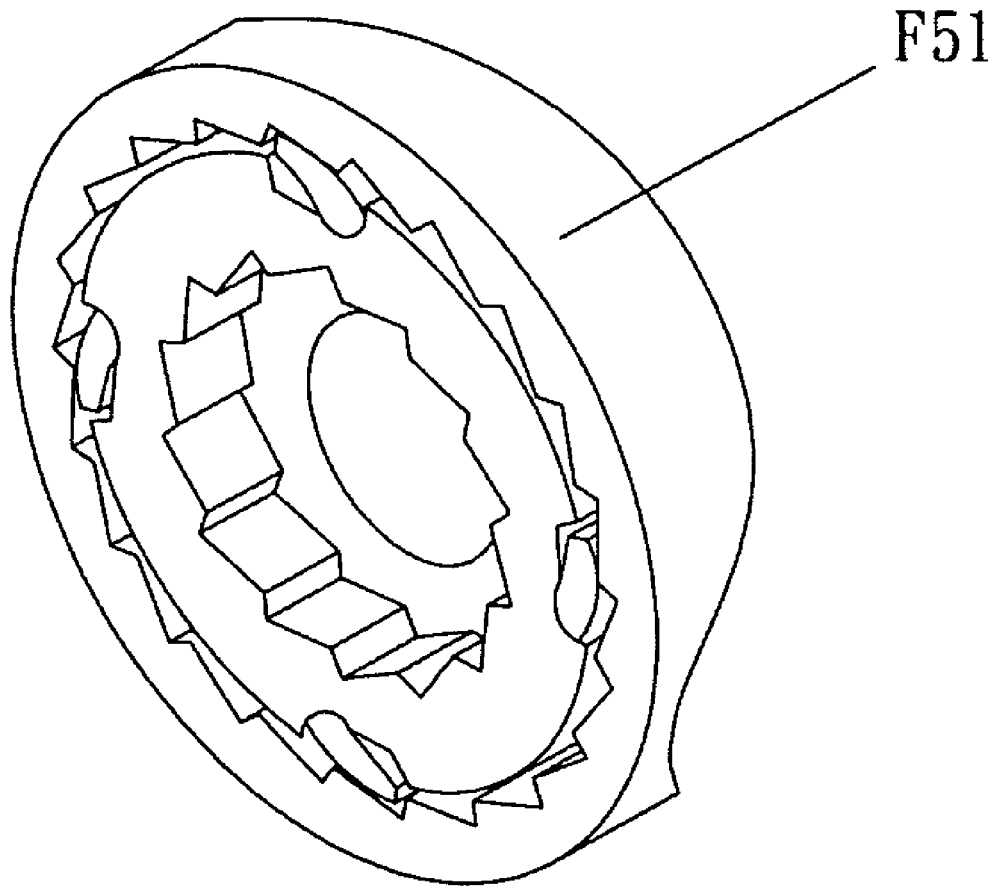
FIG. 8 is structural schematic view of the single-direction irreversible transmission element shown in the FIG. 7.
Figure 9:
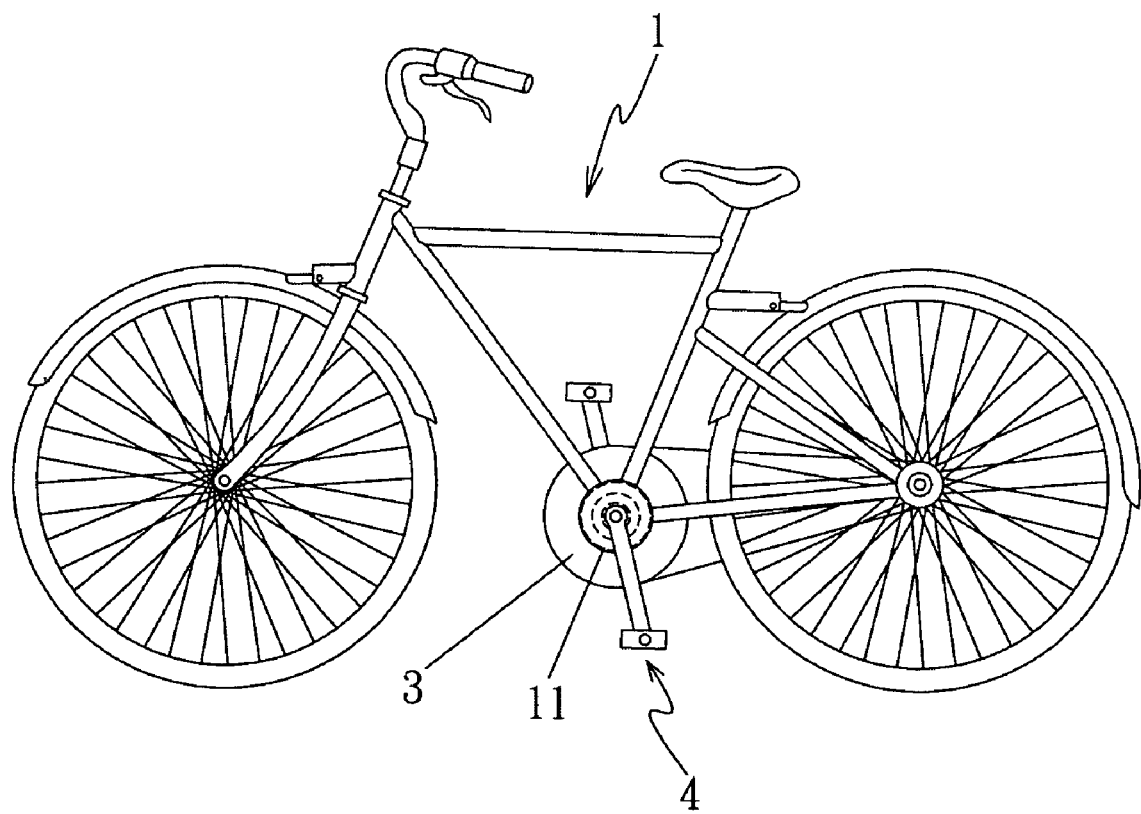
FIG. 9 is the appearance view showing the driving mechanism installed in the frame manifold node for the present invention.
Figure 10:
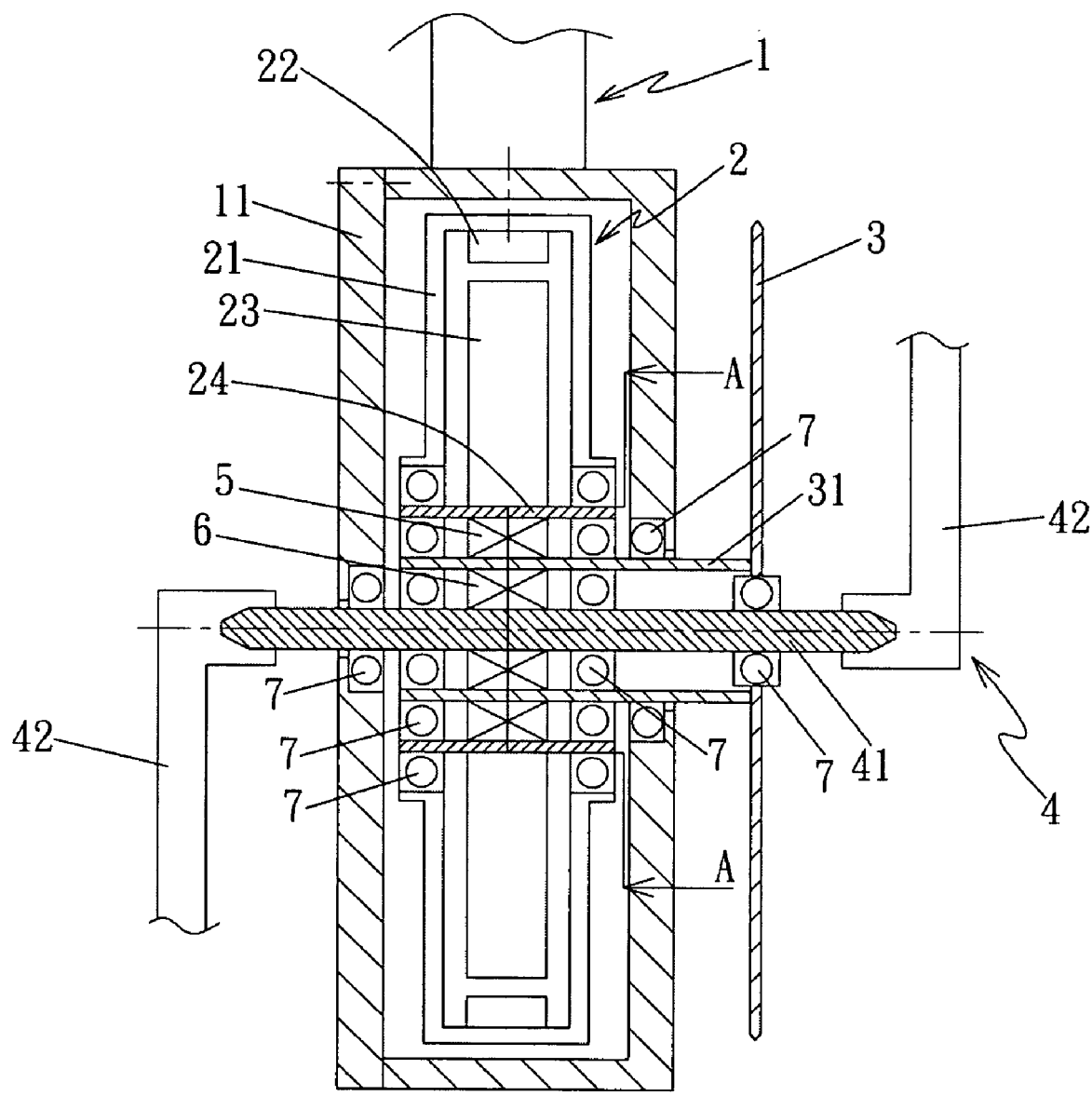
FIG. 10 is the cross section view showing the driving mechanism of the present invention.

For your better understanding and recognizing the concept and technology of the present invention, some exemplary preferred embodiments with associated drawings are described below. Please firstly refer to FIG. 9, which is the integral illustrative view showing the "driving mechanism" installed in a frame manifold node 11, where is as the lower intersection of front tube and rear tube for containing pedal crank shaft in conventional bike, of the motorized bicycle 1 for the present invention. With further reference to FIG. 10 as aided illustration, the "driving mechanism for the motorized bicycle" mainly comprises a motor driving transmission device 2, a front driving sprocket 3 and a pedal driving transmission device 4, wherein, Said motor driving transmission device 2, which is disposed on the frame manifold node 11, inwardly includes a motor shell 21, a magnet stator 22, an electromagnetic wire-coiled rotor 23 and a cylindrical hollow rotatable shaft 24 orderly in manner that the motor shell 21 with magnet stator 22 is directly fixed on the frame manifold node 11 so that the hollow rotatable shaft 24 can be driven by the wire-coiled rotor 23 to rotate;

Said front driving sprocket 3 has a transmission rotatable sleeve 31 disposed therein for inserting the hollow rotatable shaft 24 such that a ring-shaped first single-direction irreversible transmission device 5 can be annularly sandwiched in between in concentric manner;

Said pedal driving transmission device 4 comprises a pair of pedal cranks 42 and a pedal driving shaft 41, which runs through the transmission rotatable sleeve 31 and (hollow rotatable shaft 24, such that a ring-shaped second single-direction irreversible transmission device 6 can be annularly sandwiched in between in concentric manner; and Additionally, both of the first single-direction irreversible transmission device 5 and second single-direction irreversible transmission device 6 are arranged in counter manner with synergistic action so that either of motor driving transmission device 2 or pedal driving transmission device 4 can drive the transmission rotatable sleeve 31 and front driving sprocket 3 in same proper rotational direction so as to move the bicycle forwardly via transmission of the chain and rear sprocket (not shown in the figures); and some pairs of bearings 7 are placed in between of rotational friction rims such as frame manifold node 11, motor driving transmission device 2, front driving sprocket 3, pedal driving transmission device 4, first single-direction irreversible transmission device 5, second single-direction irreversible transmission device 6 and the like to make these parts rotate more smoothly.

Figure 11:
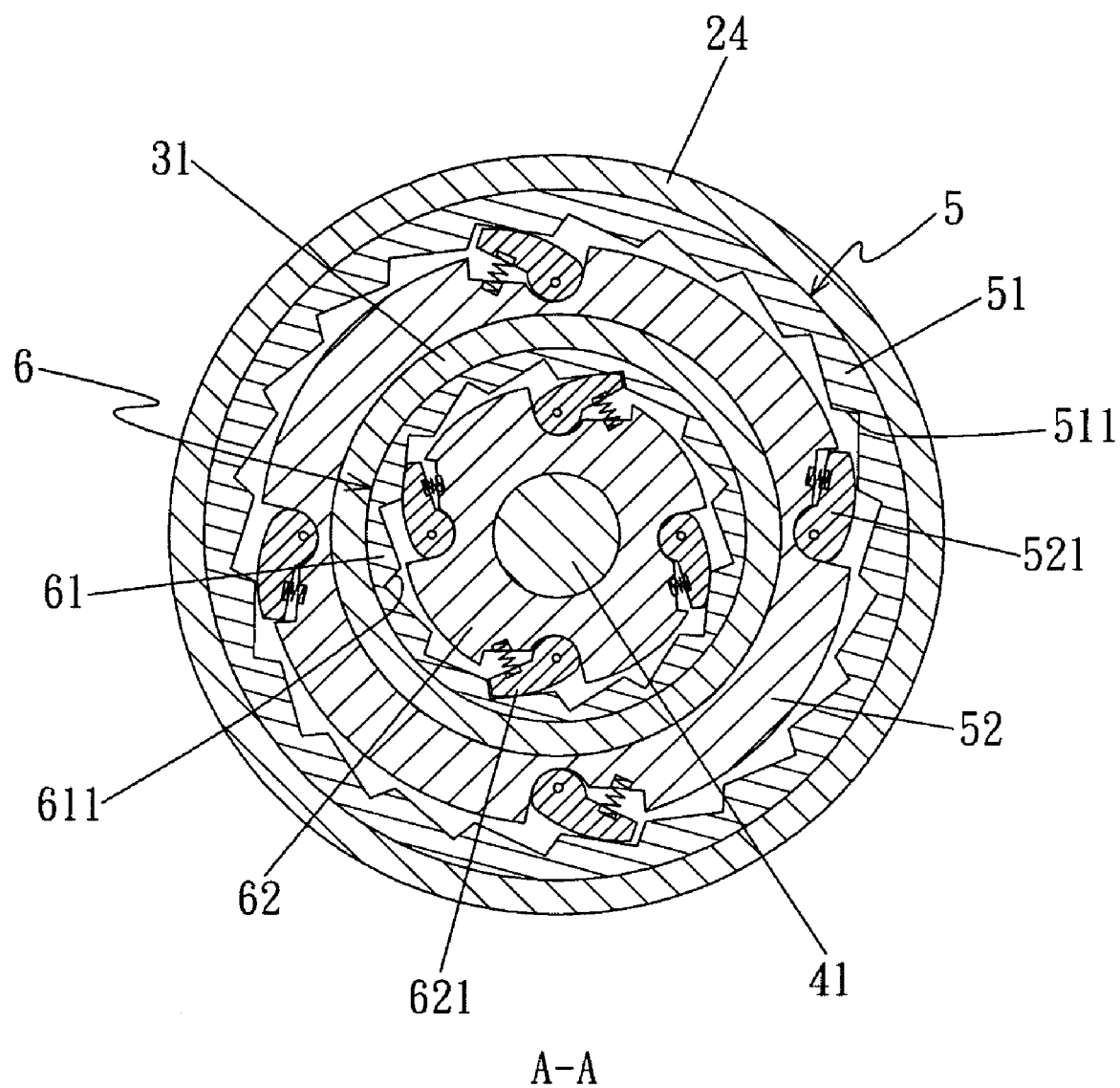
FIG. 11 is the structural schematic view showing the first and second single-direction irreversible transmission device of the present invention.

Please further refer to FIG. 11. The first single-direction irreversible transmission device 5, which is annularly sandwiched between the hollow rotatable shaft 24 of motor driving transmission device 2 and the transmission rotatable sleeve 31 of front driving sprocket 3 in concentric manner, can preferably be a set of ratchet comprising an outer ratchet ring 51 and an inner catch ring 52, wherein the plural ratchet notches 511 of cogged ratchet wheel are created on the internal rim of the outer ratchet ring 51, and plural spring-loaded pawls 521 are configured in the outer rim of the inner catch ring 52.

By means of synergistic action of the ratchet notches 511 on the outer ratchet ring 51 and the spring-loaded pawls 521 in the inner catch ring 52, both of outer ratchet ring 51 and inner catch ring 52 can run in either free idle rotating mode respectively or co-rotating mode integrally in an arresting action or locking action.

In the exemplary illustrative embodiment here, if the inner catch ring 52 rotates CW, both of outer ratchet ring 51 and inner catch ring 52 will run in free idle rotating mode respectively as the spring-loaded pawls 521 in the inner catch ring 52 will slip over the slope of the ratchet notches 511 on the outer ratchet ring 51, Conversely, if the outer ratchet ring 51 is driven by the motor driving transmission device 2 via hollow rotatable shaft 24 to rotate CW, both of outer ratchet ring 51 and inner catch ring 52 will run in co-rotating mode integrally in an arresting action or locking action as the spring-loaded pawls 521 in the inner catch ring 52 will rebound up to drop into the ratchet notches 511 on the outer ratchet ring 51 so that the inner catch ring 52 is caught and brought by the outer ratchet ring 51 to co-rotate simultaneously, which will further drive the transmission rotatable sleeve 31 of front driving sprocket 3, to accomplish the function of the first single-direction irreversible transmission device 5.

Similarly, for the second single-direction irreversible transmission device 6, which is annularly sandwiched between the transmission rotatable sleeve 31 of front driving sprocket 3 and the pedal driving shaft 41 of pedal driving transmission device 4 in concentric manner, please further refer to same FIG. 11, can preferably be a set of ratchet comprising an outer ratchet ring 61 and an inner catch ring 62, wherein the plural ratchet notches 611 of cogged ratchet wheel are created on the internal rim of the outer ratchet ring 61, and plural spring-loaded pawls 621 are configured in the outer rim of the inner catch ring 62.

By the same token, if the inner catch ring 62 is driven by the pedal driving transmission device 4 via pedal driving shaft 41 to rotate CW, both of outer ratchet ring 61 and inner catch ring 62 will run in co-rotating mode integrally in an arresting action or locking action as the spring-loaded pawls 621 in the inner catch ring 62 will rebound up to drop into the ratchet notches 611 on the outer ratchet ring 61 so that the outer ratchet ring 61 is caught and brought by the inner catch ring 62 to co-rotate simultaneously, which will further drive the transmission rotatable sleeve 31 of front driving sprocket 3, to accomplish the function of the second single-direction irreversible transmission device 6.

Figure 12:
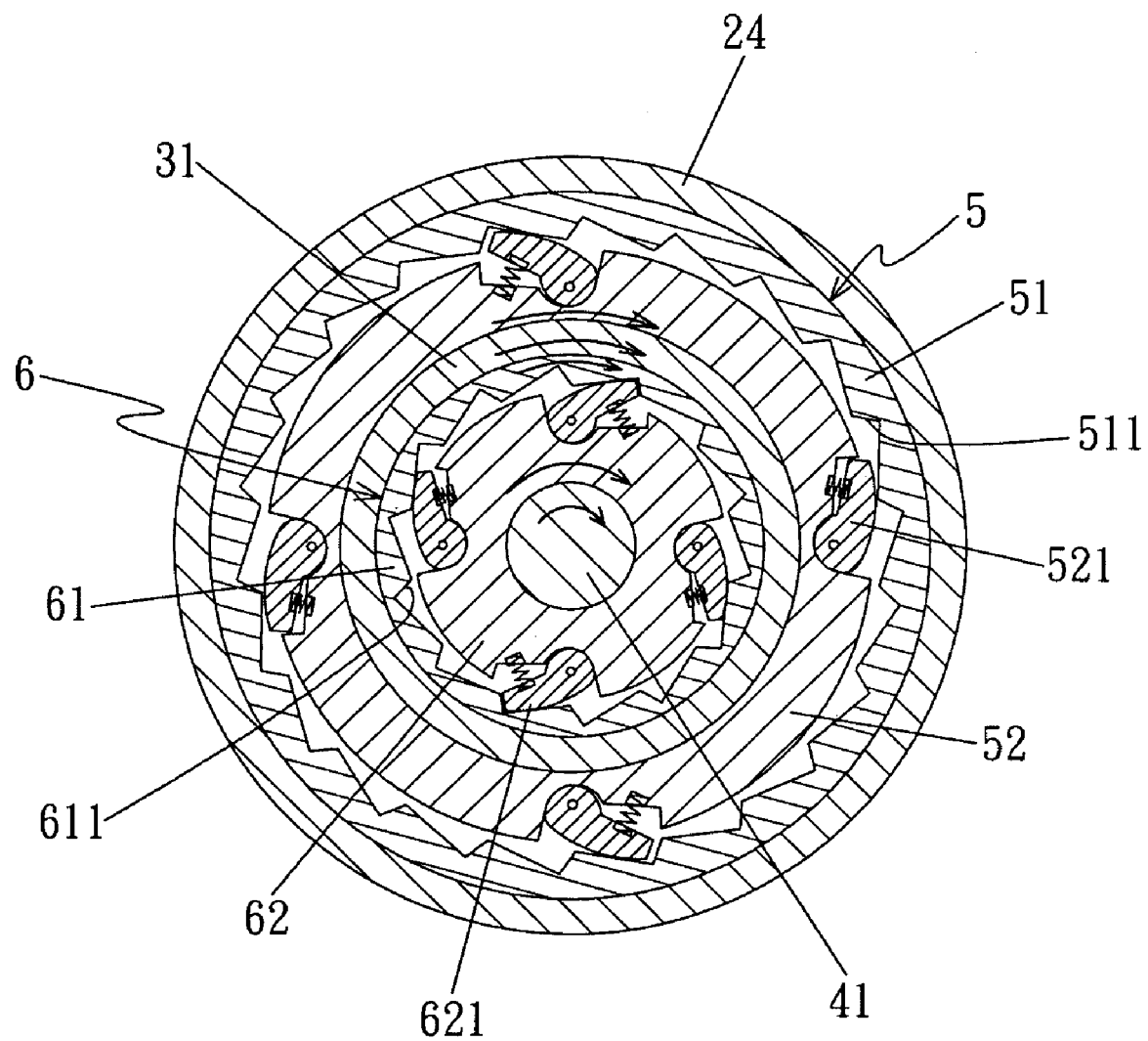
FIG. 12 is the transmission schematic view showing the "pedal driving mode" of the present invention.

By means of all the contrivances disclosed above, the bicycle rider has option in either "pedal driving mode" or "motor driving mode" to meet his/her personal requirement or preference. For example as shown in the FIG. 12, the motorized bicycle 1 is in the "pedal driving mode" as no power is supplied to the motor driving transmission device 2 and the pedal driving shaft 41 is driven to rotate CW by the pedal crank 42, which is pedaled by the bicycle rider (not shown in the figures). By arresting action or locking action between the outer ratchet ring 61 and inner catch ring 62 of the second single-direction irreversible transmission device 6 described above, both of the transmission rotatable sleeve 31 and front driving sprocket 3 are driven in same proper rotational direction so as to move the bicycle forwardly via transmission of the chain and rear sprocket. Meanwhile, the inner catch ring 52 of the first single-direction irreversible transmission device 5 is also brought to co-rotate CW by the transmission rotatable sleeve 31 simultaneously. However, as stated previously, both of outer ratchet ring 51 and inner catch ring 52 will run in free idle rotating mode respectively as the spring-loaded pawls 521 in the inner catch ring 52 will slip over the slope of the ratchet notches 511 on the outer ratchet ring 51 so that the hollow rotatable shaft 24 and electromagnetic wire-coiled rotor 23 on the motor driving transmission device 2 remain in stationary status.

Figure 13:
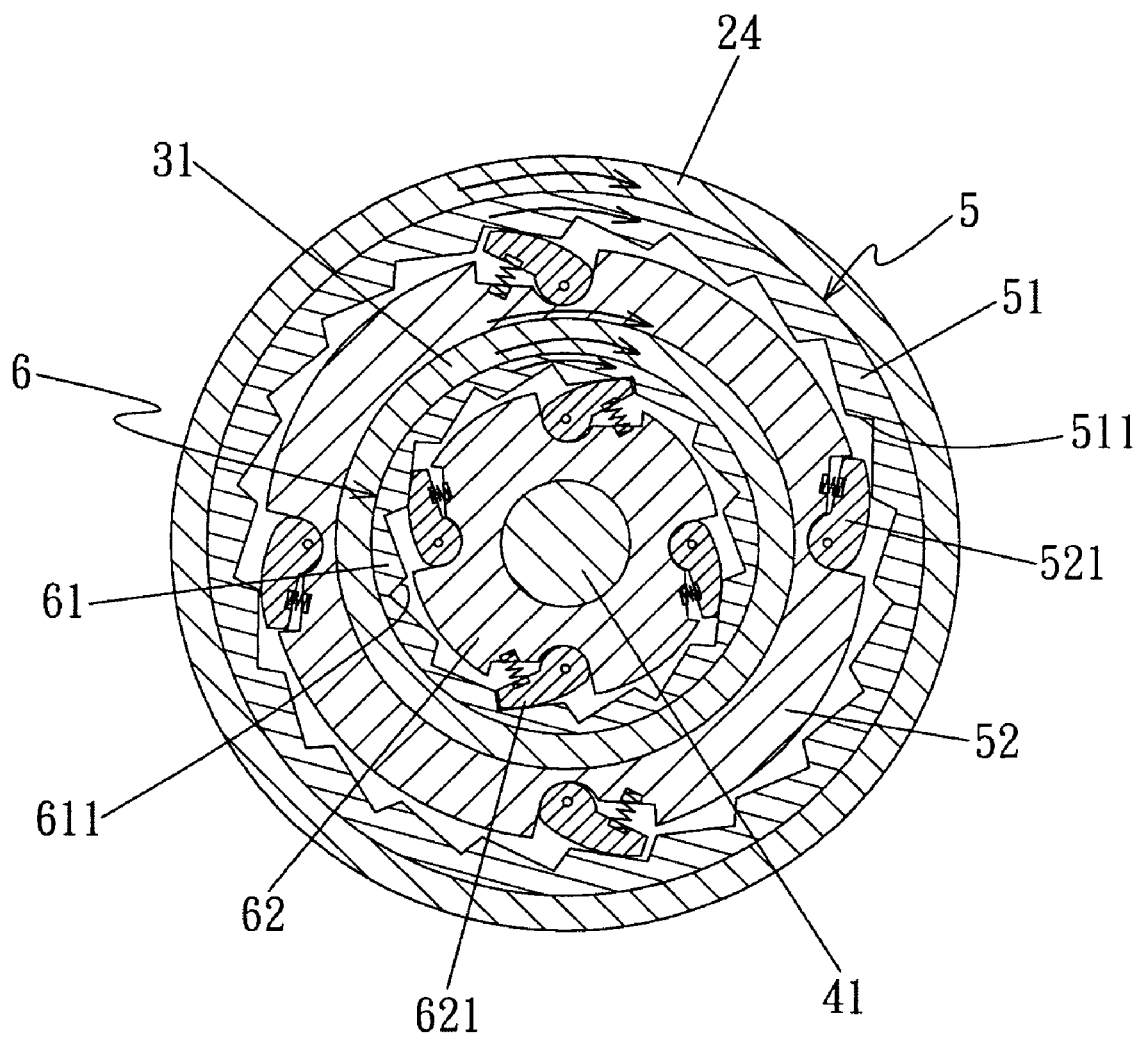
FIG. 13 is the transmission schematic view showing the "motor driving mode" of the present invention.

Conversely, as shown in the FIG. 13, the motorized bicycle 1 is in the "motor driving mode" as power is switched to supply the motor driving transmission device 2 and the hollow rotatable shaft 24 is driven to rotate CW by the electromagnetic wire-coiled rotor 23, which is driven by the motor driving transmission device 2 (not shown in the figures).

By arresting action or locking action between the outer ratchet ring 51 and inner catch ring 52 of the first single-direction irreversible transmission device 5 described above, both of the transmission rotatable sleeve 31 and front driving sprocket 3 are driven in same proper rotational direction so as to move the bicycle forwardly via transmission of the chain and rear sprocket.

Meanwhile, the outer ratchet ring 61 of the second single-direction irreversible transmission device 6 is also brought to co-rotate CW by the transmission rotatable sleeve 31 simultaneously. However, as stated previously, both of outer ratchet ring 61 and inner catch ring 62 will run in free idle rotating mode respectively as the slope of the ratchet notches 611 on the outer ratchet ring 61 will slip over the spring-loaded pawls 621 in the inner catch ring 62 so that the pedal crank 42 and pedal driving shaft 41 on the pedal driving transmission device 4 remain in stationary status.

Moreover, other than the options of "pedal driving mode" and "motor driving mode" disclosed above, additional "rehabilitating mode" is provided by a supplemental clutch 8 installed on the motorized bicycle 1 so that the rehabilitating function concurred in the "motor driving mode" for the present invention. The mechanism of the "rehabilitating mode" is accomplished by the design of the clutch 8, which lets the transmission rotatable sleeve 31 detachably cling to the pedal driving shaft 41 in coupling manner. By means of such coupling manner, the pedal driving transmission device 4 is indirectly driven by the motor driving transmission device 2 so that the feet of the rehabilitating patient are passively forced to follow the rotation of the pedal crank 42 to perform pedal exercise with good rehabilitating effect.

Figure 14:
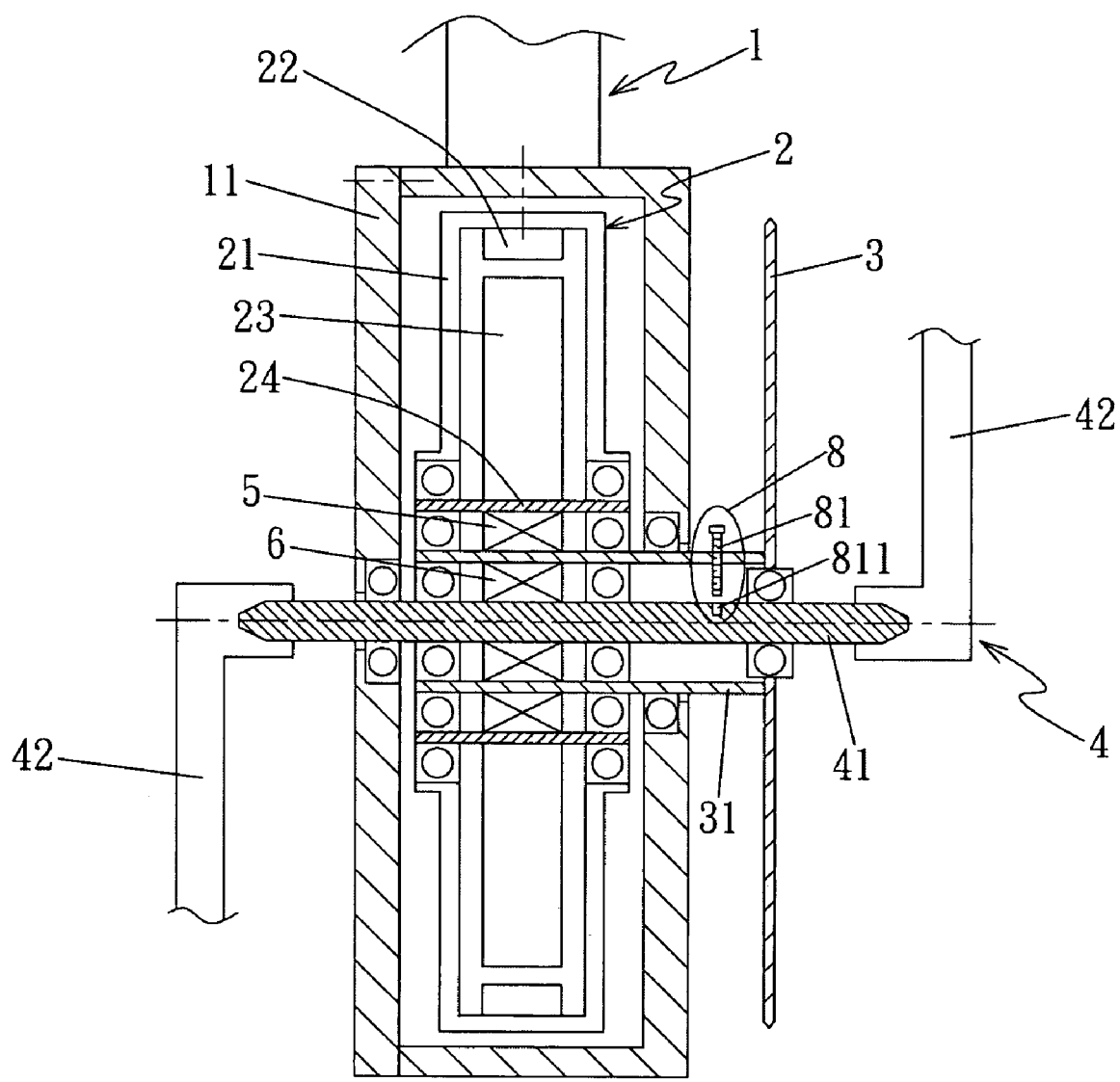
FIG. 14 is the structural schematic view showing the clutch device installed in the present invention.
Figure 15:
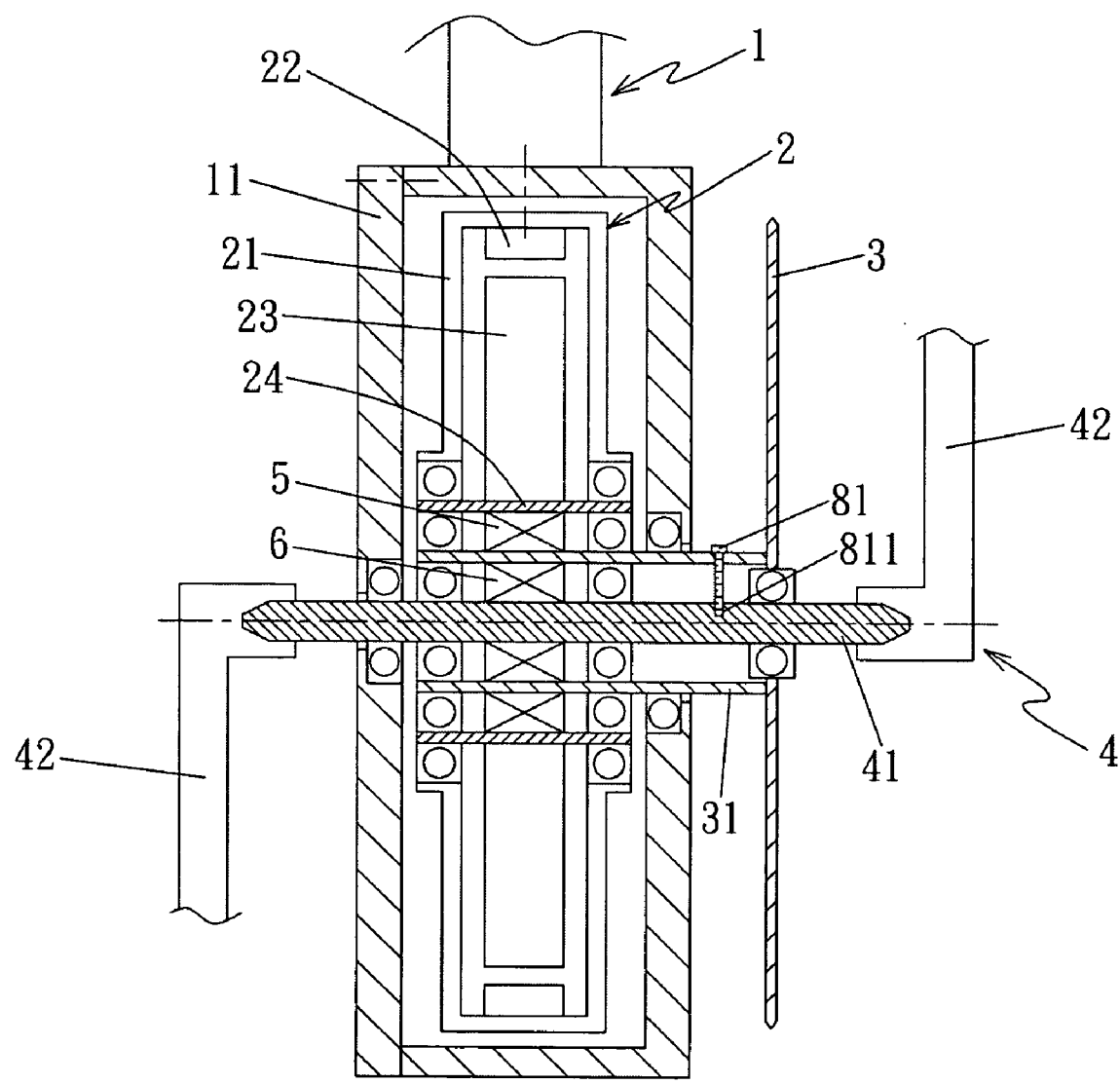
FIG. 15 is the schematic view showing the operational status of the clutch device in the present invention.

Please refer to the FIG. 14. The design concept in the "rehabilitating mode" of the present invention is accomplished by having a male threaded pin 81 disposed on the transmission rotatable sleeve 31 to serve as a clutch 8 for screwing into a female threaded bore 82 of the pedal driving shaft 41 to let the transmission rotatable sleeve 31 detachably cling to the pedal driving shaft 41 in coupling manner (as shown in the FIG. 15) so that both of the pedal driving shaft 41 and pedal crank 42 are indirectly driven by the motor driving transmission device 2 via the transmission rotatable sleeve 31 on the front driving sprocket 3. Accordingly, the user of the present invention can stand the motorized bicycle 1 in suitable location such as scenic spot with beautiful view and fresh air or the like for the rehabilitating patient riding thereon so that the feet of the rehabilitating patient are passively forced to follow the rotation of the pedal crank 42 to perform pedal exercise with good physical exercise and rehabilitating effect in employing "rehabilitating mode". However, it should be declared that the male threaded pin 81 taken in the previous disclosure is only the exemplary preferred embodiment of the clutch 8, which is not intended for limiting the embodiment range of the present invention.

All the exemplary embodiments heretofore are the basic structure of the present invention, in order to enhance the output rotational speed and torque range of the driving mechanism, an additional speed changing gear assembly 9 can be included in the driving mechanism of the present invention. By means of such speed changing gear assembly 9, the enhancing effects in the output rotational speed of the transmission rotatable sleeve 31 with front driving sprocket 3 and output torque range of the motor driving transmission device 2 can be successfully achieved. Besides, it should be declared that both of the speed changing gear assembly 9 and clutch 8 can be disposed in the driving mechanism of the present invention in together manner so that both functions of the speed changing effect and rehabilitating effect can be provided simultaneously. Therefore, both of the speed changing gear assembly 9 and clutch 8 are together shown in all the drawings below for the associated exemplary embodiments.

Figure 16:
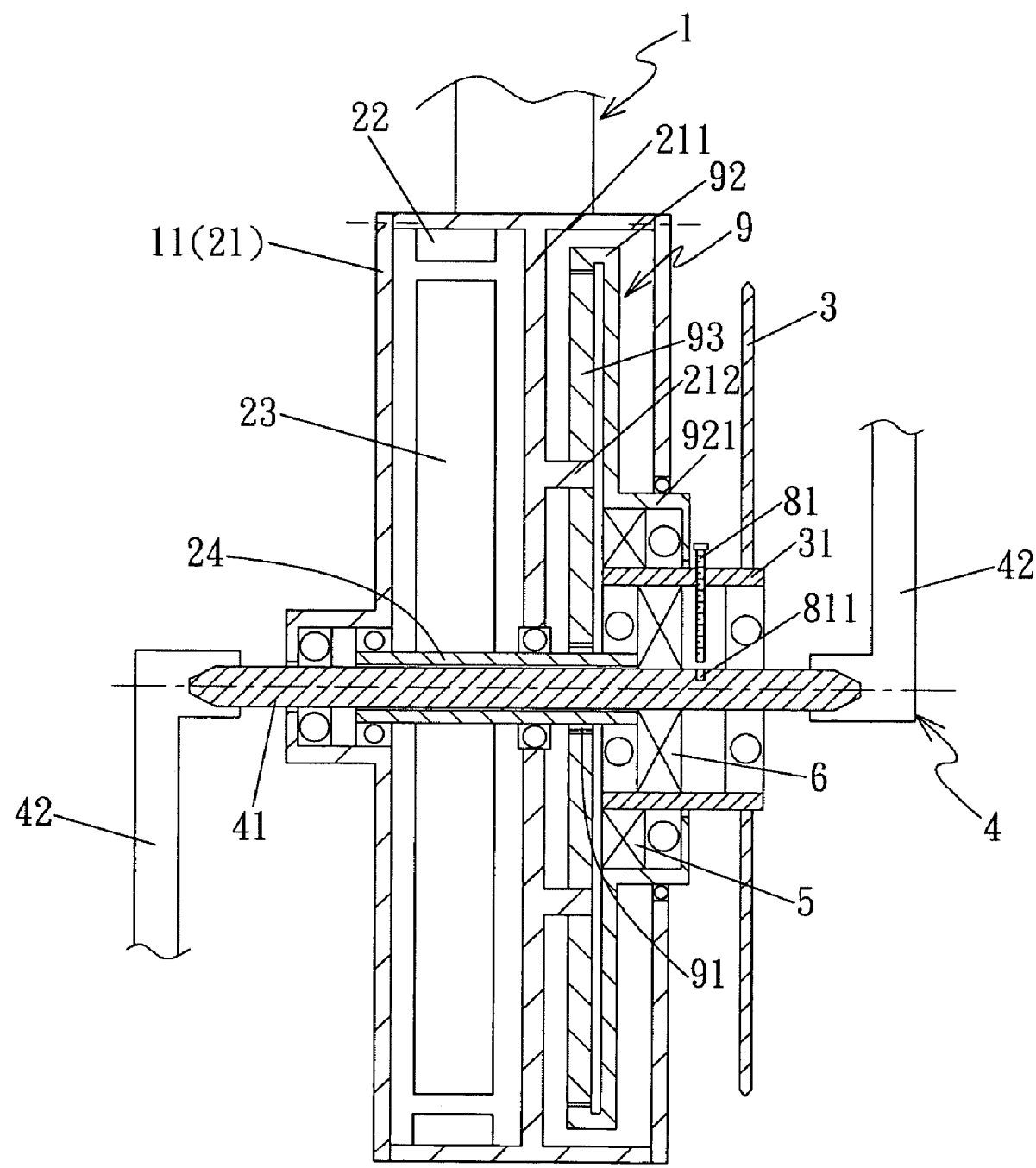
FIG. 16 is the first schematic view showing the speed reducing epicyclic gear cluster installed in the present invention.

Basically, the installing location of the speed changing gear assembly 9 is set between the motor driving transmission device 2 and front driving sprocket 3 and classified into two kinds, "core driving mode" and "rim driving mode" in practical embodiment, wherein, For said "core driving mode", please refer to the FIG. 16, the rim parts of the motor shell 21 and magnet stator 22 in the motor driving transmission device 2 are kept in stationary state while the core parts of the electromagnetic wire-coiled rotor 23 and hollow rotatable shaft 24 are freed in rotatable state. Moreover, the speed changing gear assembly 9 is disposed between the motor driving transmission device 2 and front driving sprocket 3 in the frame manifold node 11 so that the motor shell 21 in the motor driving transmission device 2 is firmly fixed with the frame manifold node 11 as an integral body to achieve the requirement from the core driving criterion.

Moreover, speed changing gear assembly 9 can be a planetary epicyclic gear cluster comprising a sun gear 91 serving as torque input driving gear, an outer ring gear 92 serving as torque output driven gear and plural planet gears 93, wherein, Said sun gear 91 is fixed on the hollow rotatable shaft 24 for being driven by the input torque therefrom for serving as torque input driving gear;

Each of said planet gears 93 is used to mesh with the sun gear 91 and the outer ring gear 92 respectively having a spindle engaged with a integrally protruding coupling spindles 212 on a partition disk 211, which is mounted in the motor shell 21 on the frame manifold node 11 in coaxial manner;

Facing the front driving sprocket 3 mounting side, said outer ring gear 92 has a hollow cylinder 921 protruded out of the frame manifold node 11 for accommodating the transmission rotatable sleeve 31 of the front driving sprocket 3;

Presently, the first single-direction irreversible transmission device 5 is annularly sandwiched between the hollow cylinder 921 and transmission rotatable sleeve 31.

Thereby, after the hollow rotatable shaft 24 having been driven by the motor driving transmission device 2, the speed changing gear assembly 9, first single-direction irreversible transmission device 5 and front driving sprocket 3 with transmission rotatable sleeve 31 are orderly driven to rotate in coaxial manner so as to achieve the speed reducing object and increasing output torque effects, wherein, dynamic behavior for the planetary epicyclic gear cluster of the speed changing gear assembly 9 is that each of planet gears 93 is driven by the sun gear 91 with hollow rotatable shaft 24 to rotate in the partition disk 211 meanwhile the outer ring gear 92 with hollow cylinder 921 are simultaneously driven to rotate.

Figure 17:
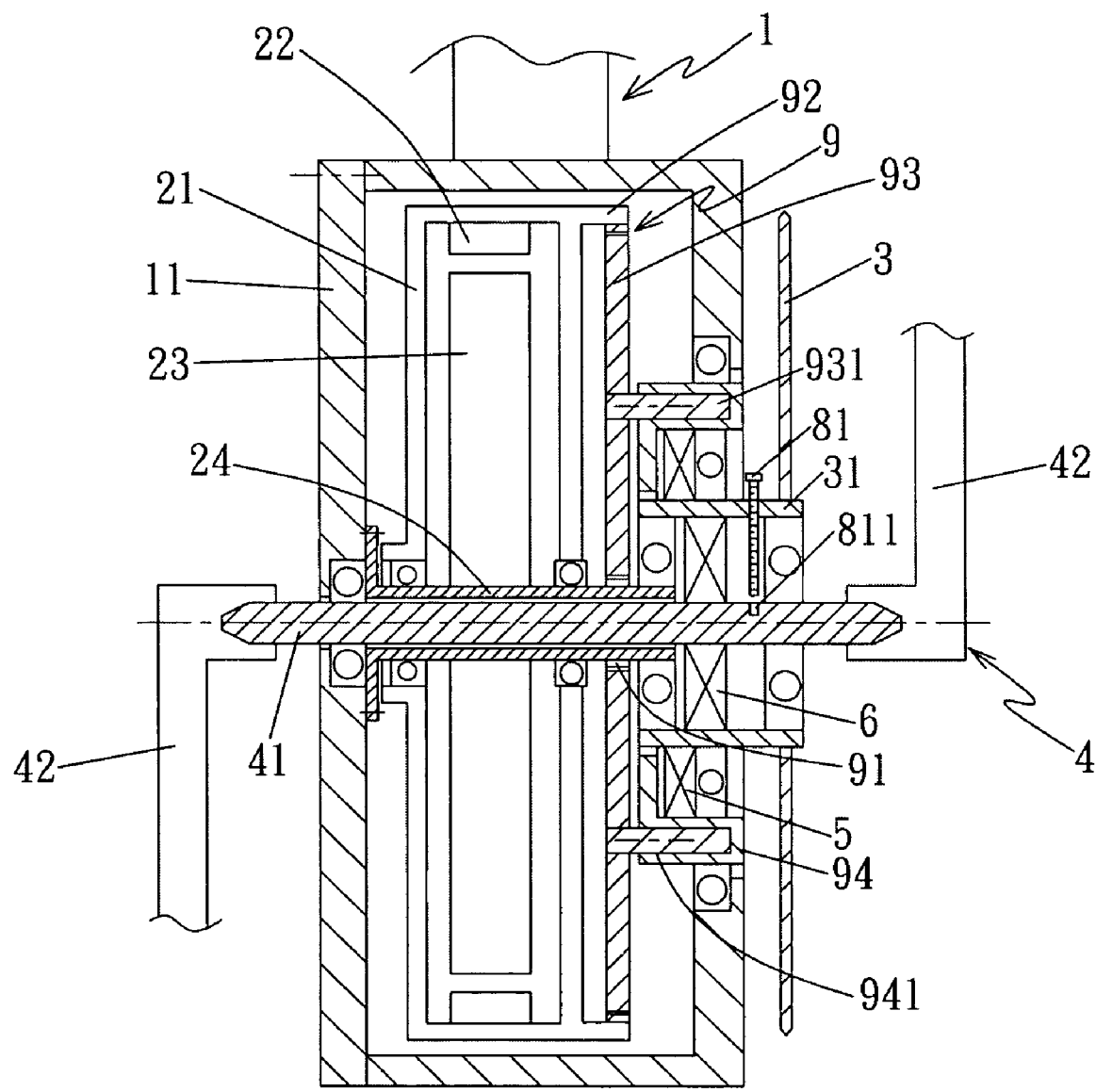
FIG. 17 is the second schematic view showing the speed reducing epicyclic gear cluster installed in the present invention.

For said "rim driving mode", please refer to the FIG. 17, contrary to the "core driving mode", the motor shell 21 and magnet stator 22 in the motor driving transmission device 2 are freed in rotatable state while the core parts of the electromagnetic wire-coiled rotor 23 and hollow rotatable shaft 24 are kept in stationary state. Moreover, the speed changing gear assembly 9 is disposed between the motor driving transmission device 2 and front driving sprocket 3 in the frame manifold node 11 so that the core parts of the hollow rotatable shaft 24 in the motor driving transmission device 2 is firmly fixed with the frame manifold node 11 as an integral body to achieve the requirement from the rim driving criterion.

Moreover, speed changing gear assembly 9 can be a planetary epicyclic gear cluster comprising a sun gear 91, an outer ring gear 92 serving as torque input driving gear, plural planet gears 93 and a coupling basin 94 serving as torque output driven means, wherein, Said sun gear 91 is fixed on the (hollow rotatable shaft 24);

Said outer ring gear 92 is integrally molded with the peripheral of the motor shell 21 directly being driven by the magnet stator 22 for serving as torque input driving gear;

Each of said planet gears 93 is used to mesh with the sun gear 91 and the outer ring gear 92 respectively having a protruding spindle 931 inserted in a corresponding bore on the coupling basin 94, which is mounted in the frame manifold node 11 in coaxial manner for serving as torque output driven means;

Facing the front driving sprocket 3 mounting side, said coupling basin 94 has an accommodating cavity 941 protruded out of the frame manifold node 11 for containing the transmission rotatable sleeve 31 of the front driving sprocket 3;

Presently, the first single-direction irreversible transmission device 5 is annularly sandwiched between the accommodating cavity 941 and transmission rotatable sleeve 31.

Thereby, after the motor shell 21 having been driven by the motor driving transmission device 2, the speed changing gear assembly 9, first single-direction irreversible transmission device 5 and front driving sprocket 3 with transmission rotatable sleeve 31 are orderly driven to rotate in coaxial manner so as to achieve the speed increasing object and reducing output torque effects, wherein, dynamic behavior for the planetary epicyclic gear cluster of the speed changing gear assembly 9 is that each of planet gears 93 is driven by the outer ring gear 92 with motor shell 21 to revolve around the sun gear 91 meanwhile the coupling basin 94 is simultaneously driven to rotate by all protruding spindles 931 of the planet gears 93.

Furthermore, the driving mechanism of the present invention in all the exemplary embodiments disclosed heretofore is mounted in the rigid frame manifold node 11 for conventional unitary molded integral frame. It should be stressed that the driving mechanism of the present invention can also be mounted in the cushioned frame manifold node 11 for those frame, which comprises front frame and rear frame in combination by suitable link. Thereby, not only the same driving effect can be remained but also the transmission chain is prevented from dropping off due to shake from the bumpy road in consequence of the keeping suitable distance between the shafts of front driving sprocket 3 and rear wheel.

Some advantages of the present invention being derived from the disclosure heretofore are described as below:

1. Versatile Options Availability:

Three operation options of "pedal driving mode", "motor driving mode" and "rehabilitating mode" with easiness in switching each other are available to be selected by the bicycle rider at his/her will so that both benefits in the convenience and facilitation in transportation and rehabilitation are provided concurrently by the present invention.

2. Simple and Compact Structure:

Comparing to the cumbersome structure of the conventional motorized bicycle, the innovative design in simple structure of the present invention not only the relative arrangement of all parts becomes more reasonable and logic but also the occupied space becomes less due to compact structure.

3. Low Production Cost:

Most of the parts involving in the production for the driving mechanism of the present invention, especially the first and second single-direction irreversible transmission devices 5, 6 are standardized products available in the market without necessity in tailor-made order so that the manufacturing process can be simplified and the production cost can be significantly reduced.

4. Employ Speed Changing Function:

Because the front driving sprocket 3 is indirectly driven by the motor driving transmission device 2 via hollow rotatable shaft 24 and first single-direction irreversible transmission device 5 instead of directly linking therewith so that the bicycle rider can change speed by switching the speed changing gear assembly 9 at side of the front driving sprocket 3 to increase the torque output and slope-climbing capability of the motorized bicycle 1 under energy-saving condition.

5. Enhance Speed Changing and Output Torque Range:

By the changing the torque output and speed from contrivances of the speed changing gear assembly 9, front driving sprocket 3 and motor driving transmission device 2, the slope-climbing capability of the motorized bicycle 1 can be easily achieved even without the assistance of the conventional multi-sprocket derailleur.

6. Feature in Rehabilitation and Recreation:

By means of the clutch 8, pedal driving transmission device 4 can be driven by the motor driving transmission device 2 so that the feet of the rehabilitating patient are passively forced to follow the rotation of the pedal crank 42 to perform pedal exercise during "rehabilitating mode". Thus, both effects in physical exercise for rehabilitation and enjoyment of beautiful scenery can be achieved concurrently.

In conclusion, the technology and contrivances disclosed in the "driving mechanism for the motorized bicycle" of the present invention, which do successfully solve the bulky and inconvenient drawbacks of the conventional motorized bicycle certainly to achieve the expected objects and effects, are neither published in any periodical or journal nor disclosed in any thesis that means the "driving mechanism for the motorized bicycle" of the present invention meets the basic patentability criterion of novelty, non-obviousness and practical industrial usage. Accordingly, we submit the patent application in accordance with the related patent laws for your perusal and examination with expectation and appeal for approving patent grant, which will be greatly appreciated by us. However, all the disclosure and illustrations heretofore are only the exemplary preferred embodiments, which are not intended for limiting the range of the embodiment for the present invention. Therefore, any equivalent alteration or modification, which does not depart from the claim range and specification essence of the present invention, should be reckoned as in the claim range of the present invention.

What is claimed is:

1. A driving mechanism for a motorized bicycle, whose driving mechanism is installed in a frame manifold node thereof, mainly comprises a motor driving transmission device, a front driving sprocket and a pedal driving transmission device, wherein, Said motor driving transmission device, which is disposed on the frame manifold node, inwardly includes a motor shell, a magnet stator, an electromagnetic wire-coiled rotor and a cylindrical hollow rotatable shaft orderly;

Said front driving sprocket has a transmission rotatable sleeve disposed therein for inserting the hollow rotatable shaft such that a ring-shaped first single-direction irreversible transmission device can be annularly sandwiched in between in concentric manner;

Said pedal driving transmission device comprises a pair of pedal cranks and a pedal driving shaft pedal crank, which runs through the transmission rotatable sleeve and hollow rotatable shaft, such that a ring-shaped second single-direction irreversible transmission device can be annularly sandwiched in between in concentric manner; and Additionally, both of the first and second single-direction irreversible transmission devices are arranged in counter manner with synergistic action so that either of motor driving transmission device or pedal driving transmission device can drive the transmission rotatable sleeve and front driving sprocket in same proper rotational direction.

2. The driving mechanism for a motorized bicycle as recited in the claim 1, wherein, said motor shell with magnet stator of the motor driving transmission device is directly fixed on the frame manifold node so that the hollow rotatable shaft, first single-direction irreversible transmission device, transmission rotatable sleeve and front driving sprocket can be driven by the wire-coiled rotor to rotate.

3. The driving mechanism for a motorized bicycle as recited in the claim 2, wherein, said motor shell in the motor driving transmission device is firmly fixed with the frame manifold node as an integral body, and a speed changing gear assembly is disposed between the motor driving transmission device and front driving sprocket, wherein said speed changing gear assembly is a planetary epicyclic gear cluster comprising a sun gear, an outer ring gear and plural planet gears, wherein, Said sun gear is fixed on the hollow rotatable shaft;

Each of said planet gears is used to mesh with the sun gear and the outer ring gear respectively having a spindle engaged with an integrally protruding coupling spindle on a partition disk;

Facing the front driving sprocket mounting side, said outer ring gear has a hollow cylinder protruded out of the frame manifold node for accommodating the transmission rotatable sleeve of the front driving sprocket;

Presently, the first single-direction irreversible transmission device is annularly sandwiched between the hollow cylinder and transmission rotatable sleeve so that the speed changing gear assembly, first single-direction irreversible transmission device and front driving sprocket with transmission rotatable sleeve are orderly driven by the hollow rotatable shaft to rotate in coaxial manner.

4. The driving mechanism for a motorized bicycle as recited in the claim 1, wherein, a speed changing gear assembly is further disposed between the motor driving transmission device and front driving sprocket, wherein said speed changing gear assembly is a planetary epicyclic gear cluster comprising a sun gear, an outer ring gear, plural planet gears and a coupling basin, wherein, Said sun gear is fixed on the hollow rotatable shaft;

Said outer ring gear is integrally molded with the peripheral of the motor shell directly being driven by the magnet stator;

Each of said planet gears is used to mesh with the sun gear and the outer ring gear respectively having a protruding spindle inserted in a corresponding bore on the coupling basin;

Facing the front driving sprocket mounting side, said coupling basin has an accommodating cavity protruded out of the frame manifold node for containing the transmission rotatable sleeve of the front driving sprocket;

Presently, the first single-direction irreversible transmission device is annularly sandwiched between the accommodating cavity and transmission rotatable sleeve so that the speed changing gear assembly, first single-direction irreversible transmission device and front driving sprocket with transmission rotatable sleeve are orderly driven by the motor shell to rotate in coaxial manner.

5. The driving mechanism for a motorized bicycle as recited in the claim 1, wherein, said first single-direction irreversible transmission device comprises an outer ratchet ring and an inner catch ring, wherein said outer ratchet ring, which is driven by the motor driving transmission device via hollow rotatable shaft directly or indirectly to rotate, has plural ratchet notches of cogged ratchet wheel created on the internal rim thereof; and said inner catch ring, which annularly wraps over outer wall of the transmission rotatable sleeve, has plural spring-loaded pawls configured in the outer rim thereof to rebound up and drop into the ratchet notches on the outer ratchet ring so that the inner catch ring is caught and brought by the outer ratchet ring to co-rotate simultaneously in single-direction rotation; Thus, after the hollow rotatable shaft having been driven by the motor driving transmission device, the transmission rotatable sleeve of front driving sprocket is further driven by the hollow rotatable shaft via the first single-direction irreversible transmission device in single-direction rotation.

6. The driving mechanism for a motorized bicycle as recited in the claim 1, wherein, said second single-direction irreversible transmission device comprises an outer ratchet ring and an inner catch ring, wherein said outer ratchet ring, which is annularly wrapped by inner wall of the transmission rotatable sleeve, has plural ratchet notches of cogged ratchet wheel created on the internal rim thereof; and said inner catch ring, which is driven by the pedal driving transmission device via pedal driving shaft to rotate, has plural spring-loaded pawls configured in the outer rim thereof to rebound up and drop into the ratchet notches on the outer ratchet ring so that the outer ratchet ring is caught and brought by the inner catch ring to co-rotate simultaneously in single-direction rotation; Thus, after the pedal driving shaft having been driven by the pedal driving transmission device, the transmission rotatable sleeve of front driving sprocket is further driven by the pedal driving shaft via the second single-direction irreversible transmission device in single-direction rotation.

7. The driving mechanism for a motorized bicycle as recited in the claim 1, wherein, a clutch is disposed between the transmission rotatable sleeve and pedal driving shaft; thereby the pedal driving transmission device is indirectly driven by the motor driving transmission device via the transmission rotatable sleeve to have rehabilitating effect.

8. The driving mechanism for a motorized bicycle as recited in the claim 7, wherein, said clutch is a male threaded pin disposed on the transmission rotatable sleeve in radial manner for screwing into a female threaded bore of the pedal driving shaft to let the transmission rotatable sleeve detachably cling to the pedal driving shaft in coupling manner to co-rotate integrally.

* * * * *